Nov. 14, 1939.     G. A. JAHANT     2,179,506
PARACHUTE RIP CORD RECEDING CONE
Filed Aug. 18, 1938

INVENTOR
GEORGE A. JAHANT
BY
Ransom K. Davis
ATTORNEY

Patented Nov. 14, 1939

2,179,506

UNITED STATES PATENT OFFICE 2,179,506

PARACHUTE RIP CORD RECEDING CONE

George A. Jahant, United States Marine Corps

Application August 18, 1938, Serial No. 225,573

5 Claims. (Cl. 244—148)

(Granted under the act of March 3, 1883, as amended April 30, 1928; 370 O. G. 757)

This invention relates to a receding cone especially intended for use with a pin of a parachute rip cord, and has for an object to provide an improved cone which assists in holding the rip cord pin securely in operative position with the parachute pack flaps in proper cooperative relation and which, when the pin is removed by operation of the rip cord, will immediately recede from the overlapped parachute pack flaps, thereby releasing the flap more quickly than with the present type of cone and permitting the parachute pack to open more quickly and more positively.

In the operation of a parachute fractions of a second between the time the rip cord is pulled and the parachute comes into operation may often mean the difference between life and death for the user. In the ordinary type of parachute pack the cone is placed on one flap of the pack and extends through a grommet in an overlapped flap, the overlapped flap which holds the parachute within the pack being held in such overlapped position by the pin of the parachute rip cord extending through an opening in the cone tip above the overlapped flap. When the rip cord is pulled to withdraw the pin the overlapped flap must move outwardly away from the underlying flap having the extending cone, thereby delaying the time for opening the pack, and further providing a possibility that the flap may jam against the cone still extending therethrough and fail to move away in the proper direction under the force of the usual elastic bands fastened thereto.

In this invention the cone automatically and immediately recedes from interengaging position with the overlapped flap when the rip cord pin is withdrawn, thereby permitting the overlapped flap to withdraw itself in the direction of the force exerted by the elastic band, making it unnecessary for the flap to come around the corner, in effect, in order to release itself.

Figure 1:
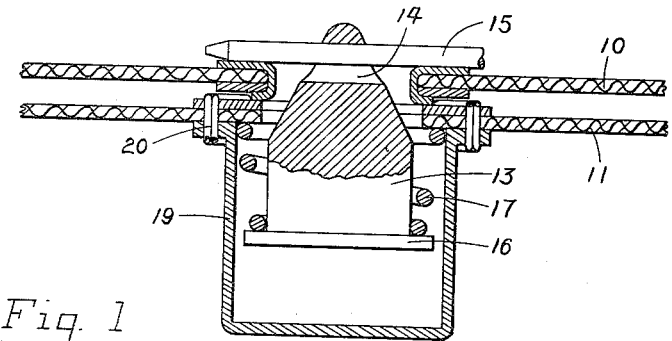

With the foregoing and other objects in view, the invention consists in the construction, combination and arrangement of parts hereinafter described and illustrated in the drawing, in which, Fig. 1 is a sectional view of the receding cone of this invention in operative parachute pack flap holding position.

Figure 2:
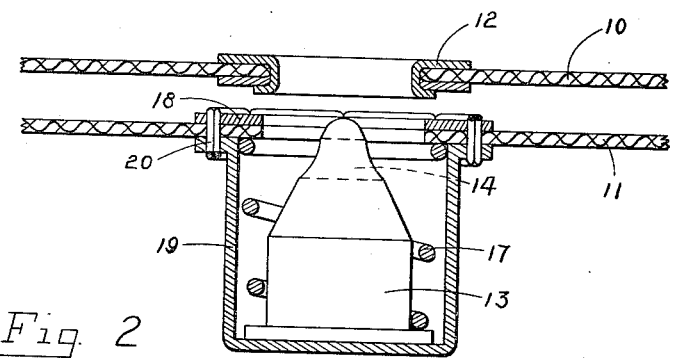
Figure 3:
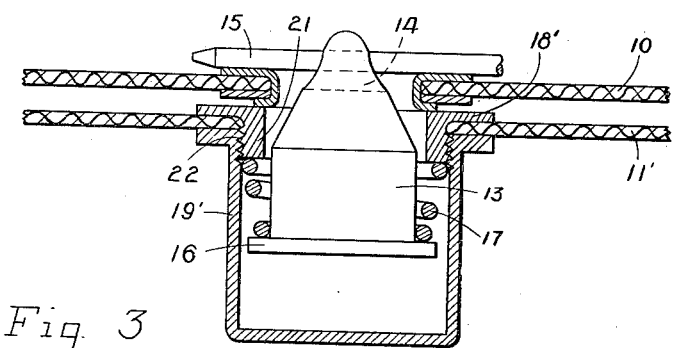

Fig. 2 is a sectional view with the cone receded after the rip cord pin has been withdrawn; and Fig. 3 is a sectional view similar to Fig. 1, but with the cone shown in elevation, with the grommet threaded into the well.

There is shown at 10 the overlapped flap of a parachute pack which is held over the underlying flap 11 of the pack in order to hold the parachute within the flap. This overlapped flap 10 is provided with a grommet 12 through which is to extend a cone 13 having a rip cord pin receiving aperture 14 near its apex. The rip cord pin 15 extends through aperture 14 to hold the flap 10 in overlapped position with the flap 11. In the present conventional parachute pack the cone 13 is mounted fixedly on the underlying flap 11. With the present invention the cone 13 is provided with a footed base 16 against which bears a compression spring 17 whose other end bears against the bottom of a grommet 18 on the flap 11. A well 19 in which the cone 13 extends is secured by a fastening 20 to the bottom of the flap 11, the fastening 20 also extending through the flap 11 and serving to likewise secure the grommet 18 thereto. The cup shaped well 19 serves to limit the motion that the compression spring 17 can press the cone 13 away from the opening in the flap 11 through grommet 18. The well 19 is preferably of such a size that when the cone 13 is held in receded position in the well 19 the tip of the cone 13 will be just barely below the upper surface of the grommet 18.

In operation, after the parachute is properly placed within the pack, the flap 10 is drawn over the flap 11, placing the grommets 12 and 18 in proper alignment. The rip cord pin 15 is then inserted through the grommet 18 so as to enter the opening 14 in cone 13, thereby drawing it upwardly from the position shown in Fig. 2 to the position shown in Figs. 1 and 3, enabling the pin 15 to be advanced through the cone opening 14 until it bridges the opening in the grommet 12. The spring 17 is compressed by this action and serves to cause the cone 13 to exert sufficient friction on the pin 15 to prevent it from accidentally withdrawing therefrom. When the parachute is to be released the rip cord is pulled in the usual manner, easily withdrawing pin 15 from engagement through the cone 13, whereupon spring 17 causes the cone 13 to immediately recede from extending through the grommet opening in flap 10 to below the level of grommet 18 within the well 19. The flap 10 is thus left free to be withdrawn by the usual elastic band in a direction more or less parallel with the plane of the flap 11, making it unnecessary for the flap to come around the corner as it would have to if the cone 13 still remained in a position projecting through the grommet 12 as it does with the conventional type of parachute pack. The flap 10 is thereby free from the possibility of jamming against the side of the cone and will be more positive and rapid in parachute releasing operation.

In the form shown in Fig. 3 the grommet 18' is provided with a depending externally threaded flange 21 which cooperates with an internal thread 22 on the well 19' to thereby secure both the grommet 18' and well 19' to the flap 11. Otherwise, the construction and operation of this form is identical with that of the first form.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. For use with a parachute pack flap and a parachute rip cord pin, an apertured rip cord receiving cone, means for mounting said cone causing it to recede from flap interengaging position when the rip cord pin is withdrawn, said means comprising a spring normally urging said cone toward withdrawn position, and a rigid well within which said cone and spring are mounted, said well limiting the recession of said cone.

2. For use with a parachute pack flap and a parachute rip cord pin, an apertured rip cord receiving cone, means for mounting said cone causing it to recede from flap interengaging position when the rip cord pin is withdrawn, said means comprising yieldable means normally urging said cone toward withdrawn position, a rigid well within which said cone and yieldable means are mounted, said well limiting the recession of said cone, a grommet partially overlying said well, a footed base on said receding cone, said yieldable means comprising a compression spring about said cone between said grommet and said footed base on said cone.

3. For use with a parachute pack flap and a parachute rip cord pin, an apertured rip cord receiving cone, means for mounting said cone causing it to recede from flap interengaging position when the rip cord pin is withdrawn, said means comprising yieldable means normally urging said cone toward withdrawn position, a rigid well within which said cone and yieldable means are mounted, said well limiting the recession of said cone, a grommet partially overlying said well, a footed base on said receding cone, said yieldable means comprising a compression spring about said cone between said grommet and said footed base on said cone, and means for securing said grommet to said well on opposite sides of the parachute flap.

4. For use with a parachute pack flap and a parachute rip cord pin, an apertured rip cord receiving cone, means for mounting said cone causing it to recede from flap interengaging position when the rip cord pin is withdrawn, said means comprising yieldable means normally urging said cone toward withdrawn position, a rigid well within which said cone and yieldable means are mounted, said well limiting the recession of said cone, a grommet partially overlying said well, a footed base on said receding cone, said yieldable means comprising a compression spring about said cone between said grommet and said footed base on said cone, and means for securing said grommet to said well on opposite sides of the parachute flap, said securing means comprising a depending externally threaded flange on said grommet and an internal cooperating thread on said well.

5. For use with a parachute pack flap and a parachute rip cord pin, an apertured rip cord receiving cone, means for mounting said cone causing it to recede from flap interengaging position when the rip cord pin is withdrawn, said means comprising yieldable means normally urging said cone toward withdrawn position, a rigid well within which said cone and yieldable means are mounted, said well limiting the recession of said cone, a grommet partially overlying said well, a footed base on said receding cone, said yieldable means comprising a compression spring about said cone between said grommet and said footed base on said cone, and means for securing said grommet to said well on opposite sides of the parachute flap, said means comprising a flexible member sewed through said grommet and flap and a portion of said well.

GEORGE A. JAHANT.